(12) United States Patent
Anderson

(10) Patent No.: US 8,006,403 B2
(45) Date of Patent: Aug. 30, 2011

(54) EDGE DETECT SYSTEM

(75) Inventor: Alan E. Anderson, Hartford, WI (US)

(73) Assignee: Messer Cutting Systems Inc., Menomonee Falls, WI (US)

( * ) Notice: Subject to any disclaimer, the term of this patent is extended or adjusted under 35 U.S.C. 154(b) by 186 days.

(21) Appl. No.: 12/545,194

(22) Filed: Aug. 21, 2009

(65) Prior Publication Data

US 2010/0043244 A1     Feb. 25, 2010

Related U.S. Application Data

(60) Provisional application No. 61/090,715, filed on Aug. 21, 2008.

(51) Int. Cl.
*G01B 5/25* (2006.01)
(52) U.S. Cl. .............................. 33/556; 33/645; 33/628
(58) Field of Classification Search .................... 33/556, 33/613, 645, 628
See application file for complete search history.

(56) References Cited

U.S. PATENT DOCUMENTS

| | | | | |
|---|---|---|---|---|
| 4,284,871 A | * | 8/1981 | Mawson et al. | 219/121.56 |
| 4,415,795 A | * | 11/1983 | Ross et al. | 219/121.44 |
| 4,439,664 A | * | 3/1984 | Toohey | 219/124.02 |
| 4,987,767 A | * | 1/1991 | Corrigan et al. | 73/23.36 |
| 5,160,821 A | | 11/1992 | Oakley | |
| 5,550,344 A | * | 8/1996 | Winterfeldt | 219/121.39 |
| 6,388,227 B1 | * | 5/2002 | Dykhno et al. | 219/121.6 |
| 6,563,084 B1 | | 5/2003 | Bandy et al. | |
| 2006/0048402 A1 | * | 3/2006 | Haimer | 33/559 |

FOREIGN PATENT DOCUMENTS

| | | |
|---|---|---|
| GB | 1222192 | 2/1971 |
| JP | 05 104249 | 4/1993 |

OTHER PUBLICATIONS

English Language Patent Abstract of Japan Publication No. 05104249.
International Search Report dated Nov. 3, 2009.

* cited by examiner

*Primary Examiner* — G. Bradley Bennett
(74) *Attorney, Agent, or Firm* — Andrus, Sceales, Starke & Sawall, LLP

(57) ABSTRACT

An edge detect system, using a torch height control system based on the use of a free floating probe in contact with the workpiece, uses a drop in pressurized air supplied to the probe tip in contact with the workpiece when the probe moves off the plate edge to generate a signal that prevents the torch from following the free floating probe downwardly and thereby prevents the cutting tool from crashing into the workpiece.

15 Claims, 5 Drawing Sheets

EDGE DETECT SYSTEM

CROSS REFERENCE TO RELATED APPLICATIONS

This application relates to and claims priority from U.S. Provisional Patent Application Ser. No. 61/090,715, filed Aug. 21, 2008.

BACKGROUND OF THE INVENTION

The present invention pertains to metal cutting torch control systems and, more particularly, to an apparatus and method for detecting the edge of a workpiece being cut with a cutting torch whereby unintended contact of the torch with the workpiece is obviated.

On thermal cutting machines, utilizing non-contact cutting torches, means are typically provided for maintaining the height of the cutting torch above the workpiece, typically a generally flat metal plate. However, because the plate may be warped and not sit flat and level with respect to the overhead cutting tool operating in a horizontal X-Y plane, height adjustment is necessary to prevent damaging contact between the torch or torches and the plate. This need is even more critical when the tools are positioned to provide bevel cutting on the plate.

Mechanical torch height sensing and control systems are known. One such system utilizes a vertically free floating probe that rides on the surface of the plate and whose vertical movement is monitored and used to adjust the height of the cutting torch above the plate in response to plate surface irregularities in order to maintain the desired height of the cutting torch above the plate. In such systems, one or more torches are mounted on a support attached to a motorized servo controlled vertical slide. The plate contact probe is mounted on the same support and positioned as close as possible to the torch or torches without being subject to damage or destruction by the heat of the cutting process. As the probe rests on and slides over the surface of the plate, the vertical position of the probe is measured by a linear transducer and the position information is processed by a CNC/PLC which provides a signal to move the torch slide up or down. By permitting the probe and torch to operate independently of each other, different torch-to-plate gaps may be set for different cutting conditions and workpiece materials. In one prior art method of the control, the plate rider probe assembly is mechanically adjusted up or down in relation to the cutting torch. The control then adjusts the height of the torches so that the voltage across the linear transducer maintains a constant value. In another prior art method, the transducer voltage value is programmed, thereby changing the operating height between the torch and the plate or other workpiece surface.

During normal cutting, without the system of the present invention, the torch may move in a path that closely approaches the edge of a cutout portion or the edge of the plate. In either situation, the height sensing probe will move off and out of contact with the plate and move downwardly. The height sensing system will respond by directing the torch to follow vertically downwardly, resulting in the torch crashing into the plate on which it is cutting.

SUMMARY OF THE INVENTION

The object of the present invention is to prevent unintended torch height change when the height sensing probe moves off the plate or into an opening in the plate. The probe is provided with a lower plate contact surface provided with an air outlet or sensing hole operatively connected to a pressurized air source. The operative connection includes a pressure sensor, flow control and pressure regulator. When the probe is resting on the plate and the air outlet sensing hole in the probe is essentially closed, relatively higher pressure will be created in the supply line than when the outlet hole is uncovered, as when the probe moves off the edge of the plate. The pressure sensor in the air supply line monitors air pressure and is set to sense the pressure drop when the probe moves off the plate to provide an output signal to the torch slide to prevent the torch from following the downward movement of the probe.

The lower surface contacting portion of the probe is preferably shaped with a uniformly upwardly curved surface transition, known in the prior art torch height control system, that permits the probe to slide easily over the plate and to ride over debris or tip-ups on the plate. In applying the probe to the present invention, the upwardly curved surface transition permits the probe to move smoothly off the plate edge, and to be moved vertically upwardly against the plate edge to permit the probe to return to the plate surface after falling off. The probe is sized and shaped to permit it to be located sufficiently close to the plate to keep the sensed pressure above a pressure that would indicate the presence of the plate. The gradual and uniform upwardly curved contour on the bottom surface portion of the probe permits torch height control with very little loss of torch height and contour accuracy upon edge detection.

In accordance with one embodiment of the invention, an edge detection apparatus is provided for a non-contact cutting tool that is mounted for three-axis travel in a programmed cutting pattern horizontally over a workpiece between the edges thereof and vertically on a servo slide. The apparatus includes a vertically free floating probe that is adapted to ride on the top surface of the workpiece and to travel horizontally with the cutting tool. The probe operates vertically on a linear transducer to monitor the vertical position of the probe and to, in turn, generate a signal that is operative to control the servo slide position of the tool and to maintain a selected gap between the tool and the workpiece. An air supply operates to provide a monitored flow of pressurized air through the probe and directly to the surface of the workpiece. An air pressure sensor is operative to sense a decrease in the pressurized air as the probe moves off an edge of the workpiece and to generate a control signal operative to hold the vertical position of the tool.

In accordance with another aspect of the invention, there is provided a method for detecting an edge of a workpiece over which a non-contact cutting torch is mounted for three-axis travel in a programmed cutting pattern horizontally over the workpiece between the edges thereof and vertically on a servo control slide. The method comprises the steps of (1) mounting a vertically free floating probe to ride on the surface of the workpiece and to travel horizontally with the cutting torch, (2) monitoring the vertical position of the probe with a linear transducer, (3) generating a probe position signal to operate the servo control slide to maintain a selected gap between the torch and the workpiece, (4) directing a flow of pressurized air through the probe and against the surface of the workpiece, (5) monitoring the pressure of the air flow, (6) sensing a decrease in pressure as the probe moves off the edge, and (7) generating a signal in response to the pressure decrease operative to hold the vertical position of the torch.

DETAILED DESCRIPTION OF THE PREFERRED EMBODIMENT

Non-contact cutting tools are well known and well developed in the prior art. These tools use various types of cutting media, including oxyfuel, plasma and lasers. A typical cutting machine, using one or more cutting torches, is typically mounted on a carriage that provides automatic torch positioning movement on three mutually perpendicular axes and, in addition, rotational movement for angularly positioning the cutting torch or torches, as for bevel cutting. A typical torch supporting carriage moves over a cutting table on which a metal plate or other workpiece is supported and cuts the workpiece in accordance with a programmed pattern. With the cutting tool operating in a horizontal X-Y cutting plane, torch height adjustment and control is necessary depending on the cutting job being performed and also to prevent damaging contact with the workpiece because of irregularities or tip-ups in the path of the cutting tools. Mechanical torch height sensing and control systems include so-called "plate rider" probes that ride on the surface of the workpiece and whose vertical movement is monitored and used to adjust the height of the cutting torch in response to workpiece surface irregularities.

The apparatus of the present invention adapts a plate rider probe to obviate the problem of the cutting torch or torches, which are spaced horizontally from the probe, from moving downwardly as the probe moves off the edge of the workpiece, causing the tools to crash into the workpiece surface.

Figure 1:
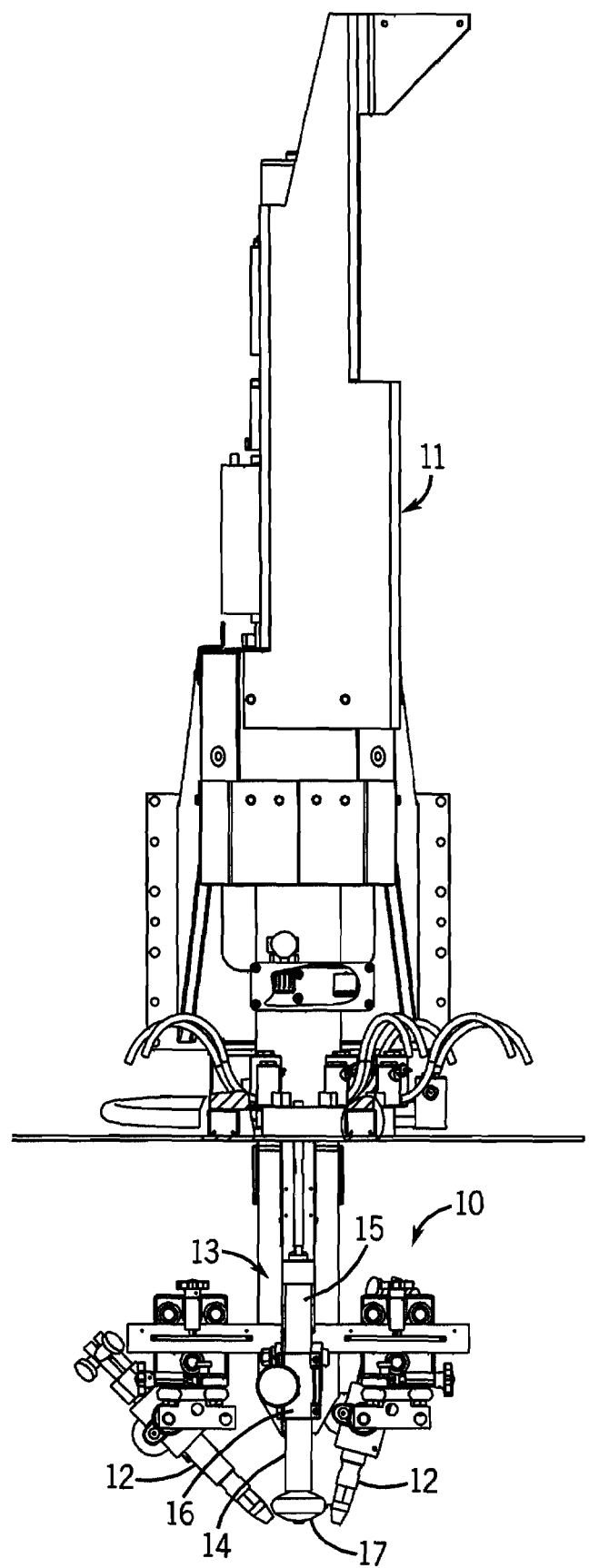
FIG. 1 is a front elevation view of an oxyfuel cutting system utilizing the edge detect apparatus of the present invention.
Figure 2:
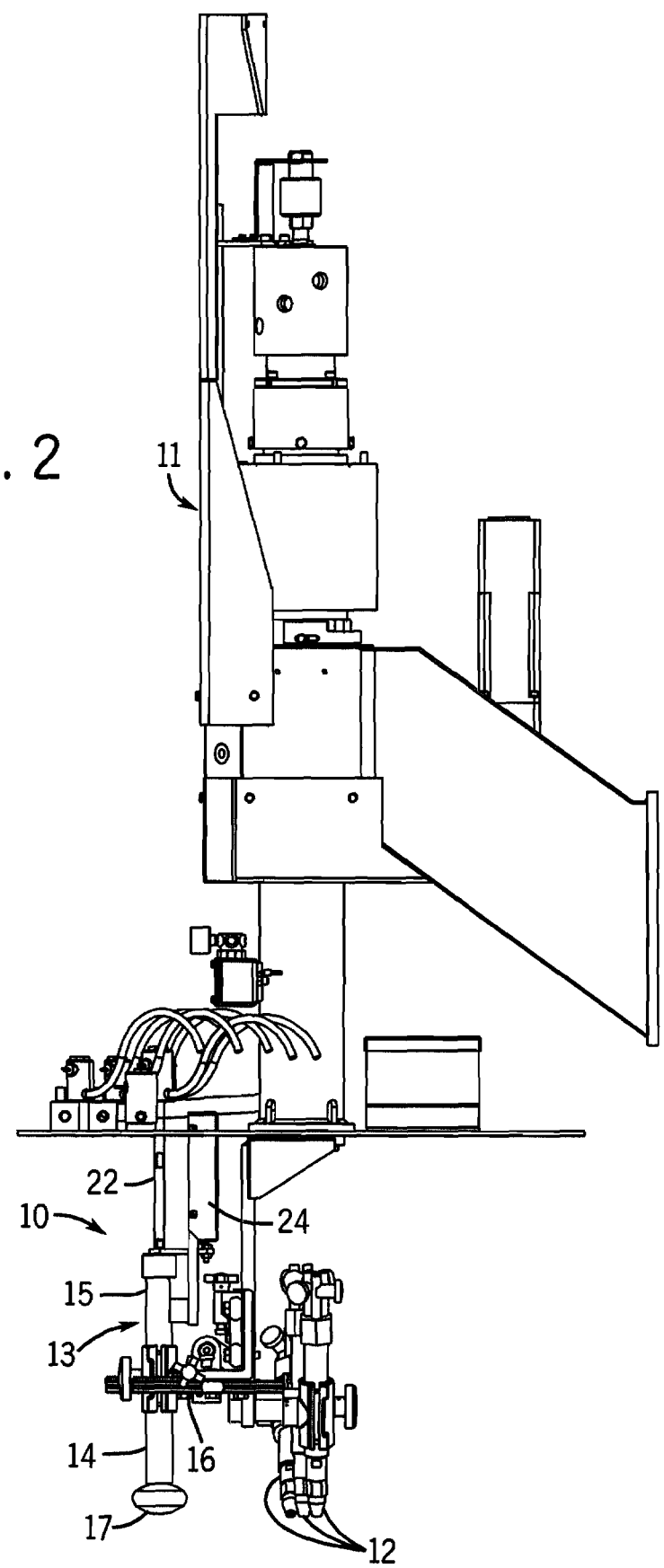
FIG. 2 is a side elevation of the cutting tool system shown in FIG. 1.
Figure 3:
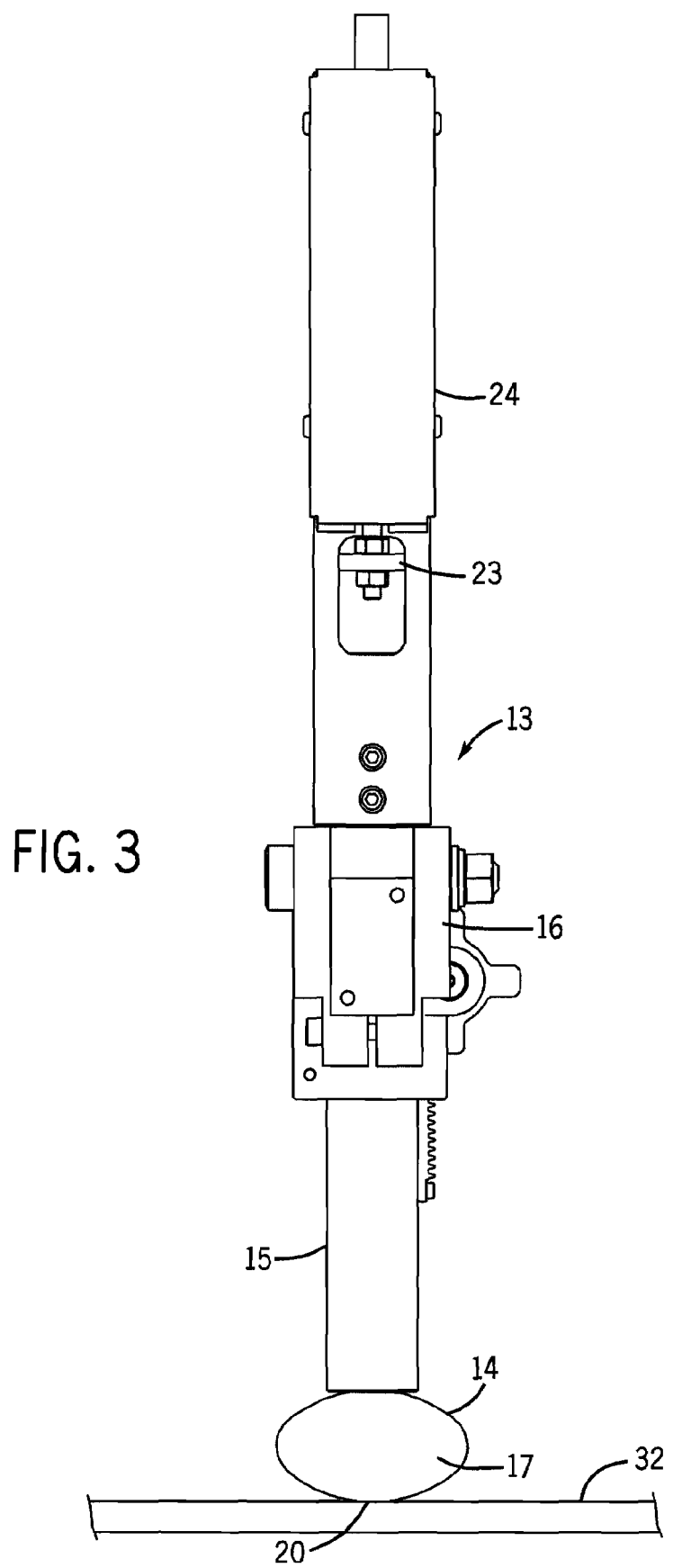
FIG. 3 is a front elevation detail of the edge detect apparatus shown in FIG. 1 with the edge detect probe riding atop a workpiece.

As shown in FIGS. 1 and 2, a three-torch cutting assembly 10 is carried on a vertical support structure 11 which, in turn, is suspended from an X-Y gantry system (not shown). However, the method and apparatus of the present invention are applicable to any type of non-contact cutting tool and to single tool systems. In the three-torch assembly shown, each of the oxyfuel torches 12 is adjustable to vary its angular position with respect to a horizontal table carrying the plate or other workpiece being cut. The torch assembly 10 is also rotatable with respect to the vertical support structure 11 to facilitate cutting circular or other curved patterns.

An edge detect probe assembly 13 of the present invention is mounted on the cutting torch assembly 10 to position an edge detect probe 14 as close as practicable to the cutting torches 12 so the probe will not be damaged or destroyed by the heat generated by the torches. The edge detect probe 14 is mounted in a cylindrical housing 15 attached directly to the torch assembly with a mounting bracket 16. The probe 14 itself, however, is mounted for free floating vertical movement in the cylindrical housing 15 such that it may move vertically up or down in response to changes in the surface of the workpiece on which it rides. The edge detect probe 14 includes a lower probe housing 17 having a hardened outer surface with a generally ellipsoidal shape. The housing 17 is essentially hollow, but includes the lower end of a rigid tubular air supply tube 18 that extends through the probe housing 17 with the lower end defining a pressurized air outlet 20. A hollow center shaft 21 is connected at its lower end to the probe housing 17 and extends upwardly through the cylindrical housing 15 for vertical sliding movement on bearing sleeves (not shown) within the housing 15. A hollow tubular rod extension 22 is attached to and extends upwardly from the upper end of the center shaft 21. At the connection between the center shaft 21 and the rod extension 22, a control arm 23 is attached to and extends horizontally into operative engagement with a linear transducer 24 carried by and secured in a fixed position on the mounting bracket 16. Vertical movement of the center shaft 21 and the probe housing 17 carried thereon is transmitted by the control arm 23 to the linear transducer to monitor the vertical position of the probe.

A supply of pressurized air 25 is provided to the upper end of the rod extension 22 via a flexible hose connection 26. Between the air supply 25 and the air supply tube 18 to the probe, there are connected an adjustable pressure regulator 27, a flow control 28, and an adjustable pressure sensor 30. Pressurized air is supplied to air outlet 20 at the bottom of the probe housing 17 and is initially set to permit the probe to remain in contact with the surface of the workpiece. During normal operation, slight vertical movements of the probe by virtue of irregularities in the surface of the workpiece are picked up by the linear transducer 24 and a signal is generated by a PLC 31 to cause the cutting torch 12 to move vertically in accordance with the movement of the probe all in a manner well known in the art.

Figure 4:
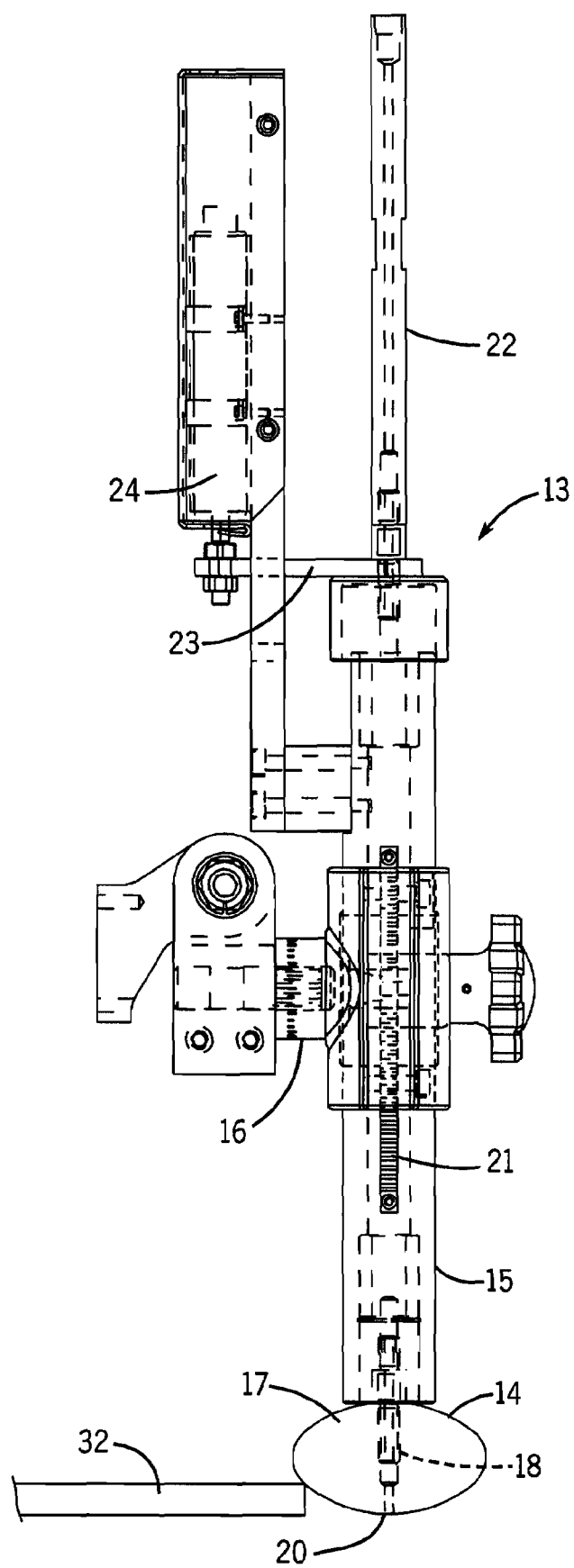
FIG. 4 is an end elevation detail of the edge detect apparatus shown in FIG. 1 in which the apparatus has dropped off the edge of the workpiece.
Figure 5:
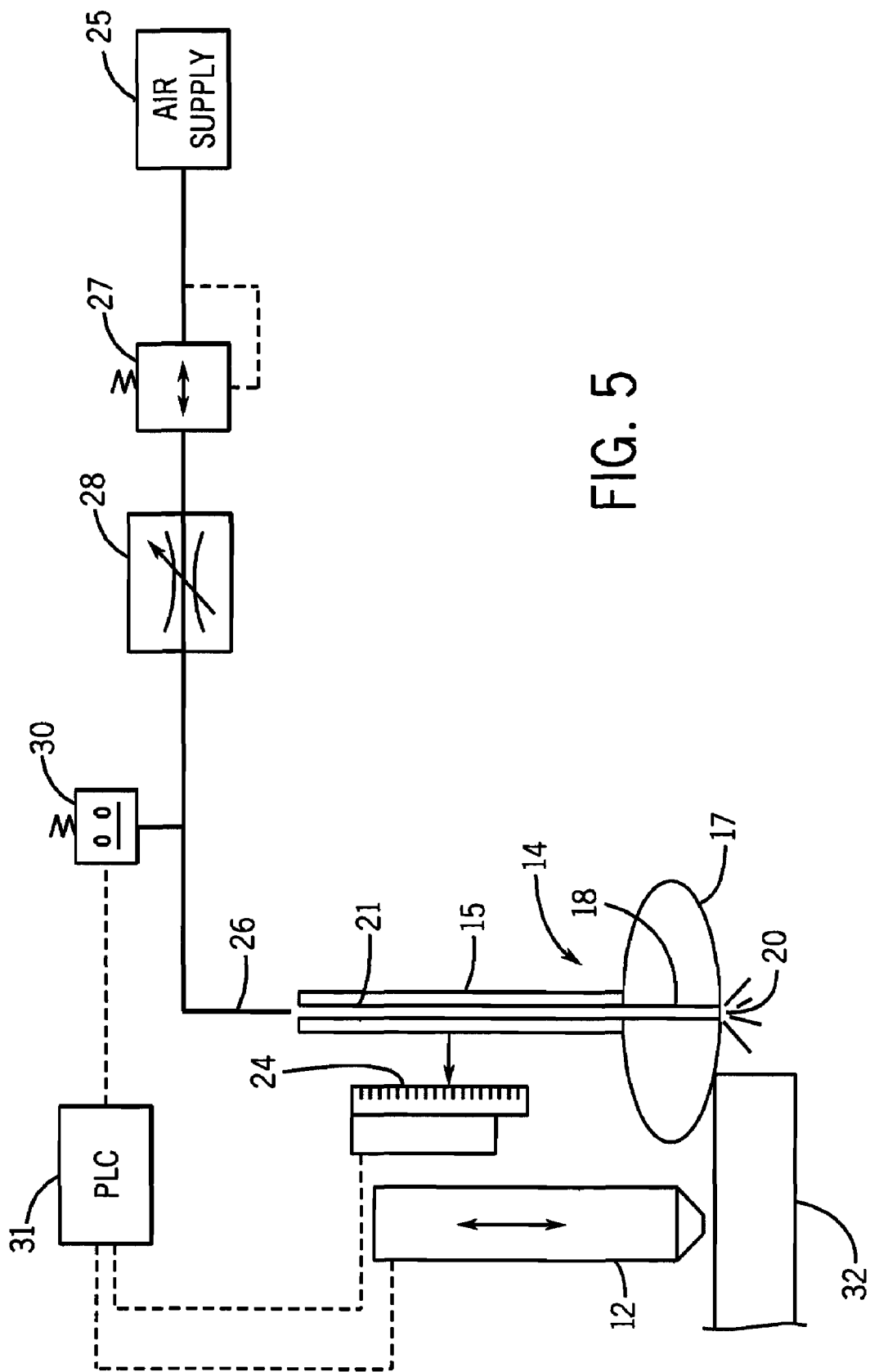
FIG. 5 is a schematic representation of the edge detect system of the present invention.

However, if the probe 14 begins to move off the edge of the workpiece or plate 32, as shown in FIG. 4, the elliptical or ellipsoidal shape of the probe housing 17 will permit the free floating probe to begin to move downwardly at an increasing rate due to the surface of the probe curving increasingly more rapidly in the upward direction. Without an edge detect system, if the probe housing moves completely off and out of contact with the plate 32, the free floating probe will drop vertically and the corresponding signal to the transducer 24 will be processed by the PLC to cause the cutting torch 12 to also drop vertically and crash into the plate. However, as the probe moves off the plate and the air outlet 20 in the bottom of the probe housing 17 moves out of closing contact with the plate, the rapid decrease in air pressure will be sensed by the pressure sensor 30 and a signal generated thereby to the PLC and will operate to immediately halt downward movement of the torch 12 and prevent it from crashing into the plate.

The ellipsoidal shape of the bottom of the probe housing 17 is significant because it minimizes the drop in height of the cutting tool until the air outlet 20 is unblocked and opens and, in addition, the probe housing shape provides a much smoother transition as the probe returns to the plate and rides up over the plate edge.

I claim:

1. An edge detection probe for a non-contact cutting torch operating horizontally over a workpiece, the probe operative to control the vertical position of the torch over the workpiece, the probe comprising:

a probe housing mounted to rest in contact with the workpiece and to float freely in the vertical direction in response to vertical changes in the workpiece surface during horizontal torch movement;

the probe housing having a lower surface portion providing the contact with the workpiece;

a pressurized air outlet in the lower surface portion of the probe for directing pressurized air from a source against the workpiece; and, means for monitoring the air pressure and for generating a torch control signal in response to a pressure drop indicative of movement of the probe air outlet off an edge of the workpiece, the signal operative to hold the vertical position of the torch.

2. The apparatus as set forth in claim 1 wherein the lower surface portion of the probe comprises a uniformly upwardly curved surface transition surrounding the air outlet.

3. The apparatus as set forth in claim 2 wherein the lower surface portion of the probe is ellipsoidal.

4. The apparatus as set forth in claim 1 wherein the air pressure monitoring means comprises a pressure sensor having a direct connection to the pressurized air outlet.

5. The apparatus as set forth in claim 4 comprising a flow control and pressure regulator between the pressure sensor and the source of pressurized air.

6. An edge detection apparatus for a non-contact cutting tool mounted for 3-axis travel in a programmed cutting pattern horizontally over a workpiece between the edges thereof and vertically on a servo slide, the apparatus comprising:
   a vertically free floating probe adapted to ride on the top surface of the workpiece and to travel horizontally with the cutting tool;
   the probe operative vertically on a linear transducer to monitor the vertical position of the probe to, in turn, generate a signal operative to control the servo slide position of the tool and maintain a selected gap between the tool and the workpiece;
   an air supply operative to provide a monitored flow of pressurized air through the probe and directly to the surface of the workpiece; and,
      an air pressure sensor operative to sense a decrease in the pressurized air as the probe moves off the edge of the workpiece and to generate a control signal operative to hold the vertical position of the tool.

7. The apparatus as set forth in claim 6 wherein the air supply comprises:
   a source of pressurized air for the probe; and,
   the pressurized air source directing air to an air outlet in a bottom surface portion of the probe in direct contact with the surface of the workpiece.

8. The apparatus as set forth in claim 7 wherein the bottom surface portion of the probe comprises an upwardly curved surface transition surrounding the air outlet.

9. The apparatus as set forth in claim 6 wherein the probe is attached to the cutting tool.

10. The apparatus as set forth in claim 9 wherein the probe and the tool are attached to a common carriage.

11. A method for detecting an edge of a workpiece over which a non-contact cutting tool is mounted for horizontal travel in a programmed cutting pattern, and wherein a vertically free moving probe assembly is mounted to ride on the top surface of the workpiece, to travel horizontally with the cutting tool, and to generate a signal operative to change the vertical position of the tool in response to vertical movement of the probe over the surface, the method comprising the steps of:
   (1) providing a lowermost surface portion of the probe with a pressurized air outlet;
   (2) directing, in use, a flow of pressurized air to the outlet from a source of pressurized air;
   (3) monitoring the pressure of the air supplied to the probe outlet;
   (4) sensing a decrease in the monitored pressure as the probe moves off the edge of and out of contact with the workpiece; and,
   (5) using the sensed pressure decrease to generate a signal operative to hold the vertical position of the tool.

12. The method as set forth in claim 11 including the step of providing the lowermost surface portion with an upwardly curved surface transition surrounding and centered on the outlet.

13. The method as set forth in claim 11 including the step of providing the lowermost surface portion with an ellipsoidal surface transition surround the air outlet.

14. The method as set forth in claim 11 including the steps of:
   (1) providing a selectively regulated flow of pressurized air from the source; and,
   (2) sensing the decrease in pressure with a pressure sensor in an air supply line between the source and the outlet.

15. A method for detecting an edge of a workpiece over which a non-contact cutting torch is mounted for 3-axis travel in a programmed cutting pattern horizontally over the workpiece between the edges thereof and vertically on a servo control slide, the method comprising the steps of:
   (1) mounting a vertically free floating probe to ride on the surface of the workpiece and to travel horizontally with the cutting torch;
   (2) monitoring the vertical position of the probe with a linear transducer;
   (3) generating a probe position signal to operate the servo control slide to maintain a selected gap between the torch and the workpiece;
   (4) directing a flow of pressurized air through the probe and against the surface of the workpiece;
   (5) monitoring the pressure of the air flow;
   (6) sensing a decrease in pressure as the probe moves off the edge;
   (7) generating a signal in response to the pressure decrease operative to hold the vertical position of the torch.

\* \* \* \* \*